(12) United States Patent
Merlin et al.

(10) Patent No.: US 9,318,790 B2
(45) Date of Patent: Apr. 19, 2016

(54) PORTABLE DEVICE WITH APERTURED ELECTRICAL CONTACTS

(75) Inventors: Lionel Merlin, Saint Savournin (FR); Nizar Lahoui, Aubagne (FR); Arek Buyukkalender, Marseilles (FR); Lucile Dossetto, Saint Cyr sur Mer (FR); Laurence Robertet, Gemenos (FR); Catherine Brondino, Biver (FR); Frédérick Seban, Auriol (FR)

(73) Assignee: GEMALTO SA, Meudon (FR)

( * ) Notice: Subject to any disclaimer, the term of this patent is extended or adjusted under 35 U.S.C. 154(b) by 138 days.

(21) Appl. No.: 14/130,260

(22) PCT Filed: Jun. 22, 2012

(86) PCT No.: PCT/EP2012/062153
§ 371 (c)(1),
(2), (4) Date: Feb. 12, 2014

(87) PCT Pub. No.: WO2013/004522
PCT Pub. Date: Jan. 10, 2013

(65) Prior Publication Data
US 2014/0152511 A1    Jun. 5, 2014

(30) Foreign Application Priority Data

Jul. 1, 2011    (EP) .................................... 11305857

(51) Int. Cl.
*H01L 35/00*    (2006.01)
*H01Q 1/22*    (2006.01)
(Continued)

(52) U.S. Cl.
CPC ................ *H01Q 1/22* (2013.01); *G06K 19/077* (2013.01); *G06K 19/07749* (2013.01);
(Continued)

(58) Field of Classification Search
CPC ...... H01L 35/00; G06Q 20/105; G06Q 20/10; G06K 19/07749
USPC .................... 343/700; 705/41, 71, 39; 29/600
See application file for complete search history.

(56) References Cited

U.S. PATENT DOCUMENTS 6,378,774 B1    4/2002    Emori et al.
2005/0003729 A1    1/2005    Mizobe
(Continued)

FOREIGN PATENT DOCUMENTS

EP    1 031 939 B1    8/2000
EP    1 492 148 A2    12/2004
(Continued)

OTHER PUBLICATIONS

International Search Report (PCT/ISA/210) mailed on Apr. 22, 2013, by the European Patent Office as the International Searching Authority for International Application No. PCT/EP2012/062153.
(Continued)

*Primary Examiner* — Joseph Lauture
(74) *Attorney, Agent, or Firm* — Buchanan Ingersoll & Rooney PC

(57) ABSTRACT

The invention relates to a portable electronic device comprising a supporting member receiving on one side conductive contact lands or tracks extending substantially as far as the edge of the side and connecting an electronic microcircuit, the conductive contact lands or tracks comprising a plurality of perforations. The device is noteworthy in that the interior of the perforations is free, or intended to be kept free, of metal.

9 Claims, 3 Drawing Sheets

(51) Int. Cl.
*G06K 19/077* (2006.01)
*G06Q 20/10* (2012.01)

(52) U.S. Cl.
CPC ............. *G06Q 20/10* (2013.01); *G06Q 20/105* (2013.01); *H01L 35/00* (2013.01); *H01L 2224/45147* (2013.01); *H01L 2224/48091* (2013.01); *H01L 2224/48227* (2013.01); *H01L 2224/48228* (2013.01)

(56) References Cited

U.S. PATENT DOCUMENTS

| 2007/0200215 A1 | 8/2007 | Janke et al. |
| 2008/0245879 A1 | 10/2008 | Artigue et al. |
| 2009/0271972 A1* | 11/2009 | Caruana et al. ................. 29/600 |

FOREIGN PATENT DOCUMENTS

| EP | 1 932 104 A1 | 6/2008 |
| FR | 2 765 010 B1 | 12/1998 |
| JP | 2002-236900 A | 8/2002 |
| KR | 2010-0095886 A | 9/2010 |
| WO | WO 2007/026077 A1 | 3/2007 |

OTHER PUBLICATIONS

Written Opinion (PCT/ISA/237) mailed on Apr. 22, 2013, by the European Patent Office as the International Searching Authority for International Application No. PCT/EP2012/062153.

* cited by examiner

PORTABLE DEVICE WITH APERTURED ELECTRICAL CONTACTS

FIELD OF THE INVENTION

The present invention relates to chip card portable devices and a method for producing such devices.

In particular, it relates to portable electronic devices comprising a supporting member, a rear side of which receives an antenna connecting an electronic microcircuit and a side comprising contact lands at least partially extending as far as the edge of the side.

These electronic devices can more particularly be found in electronic labels and contactless chip cards, contact and contactless hybrid chip cards provided with an electronic module.

A common but by no means restricting standard for the present invention is the so-called ISO 7810 standard which concerns a card having a standard format, i.e. 85 mm in length, 54 mm in width and 0.76 mm in thickness. The contacts are defined by the 7816 standard particularly as regards the positioning and extent thereof.

STATE OF THE ART

The applicant's patent application EP 1 492 148 A2 is known, which describes the principle of an antenna module comprising a substrate, the rear side of which carries a flat wound radiofrequency antenna and the front side of which carries contact lands for communicating with a contact reader.

Patent EP 1031939 (B1) is also known, which describes a hybrid type chip card with improved radiofrequency performances. It describes a card with an antenna module of the type above magnetically coupled with a relay antenna arranged in the card body.

Patent FR2765010 (B1) also describes a dual interface antenna module. The antenna is arranged on the periphery of the electrical contacts to avoid a radiofrequency waves barrier formed by the contact lands and thus to improve the radiofrequency communication. The electromagnetic permeability of the module is thus improved.

The patent application US2009/0271972 describes a contactless chip card using a contactless chip module comprising perforated connection lands. These lands are pre-perforated or perforated during a sewing operation using a sewing needle. These perforations contain a metallic antenna wire which remains inside the perforations when the antenna is connected to the connection lands.

Patent application EP 1932104 (A1) shown in FIG. 1 also describes an antenna module 11 coupled with a relay antenna in a chip card comprising means for improving the magnetic permeability. It teaches placing the antenna on the periphery of the contact lands 19 on the rear side opposite the one carrying the contact lands and placing on the periphery and outside the contact lands, a plurality of protrusions 33 substantially extending from the lands to the periphery of the module. In addition to providing electromagnetic permeability, such positioning contributes to distribute a module bonding pressure in a chip card body cavity during the module inlay phase.

The protrusions may be obstacles and/or cause wear of some readers connectors when the card is inserted into the reader slot.

The invention aims to avoid the above drawbacks.

The present invention also provides a module construction enabling a reduction in the production costs while maintaining the electromagnetic permeability performances relative to a radiofrequency communication antenna more particularly according to the ISO/IEC 14443 standard.

The principle of the invention mainly consists in designing contact lands, apertured electric tracks or positioning perforations calibrated up to a maximum, on such metal parts outside the standardized areas.

To this end, the invention relates to a portable electronic device comprising a supporting member receiving on one side conductive contact lands or tracks extending substantially as far as the edge of the side and connecting an electronic microcircuit, with the conductive contact lands or tracks comprising a plurality of perforations, characterized in that the interior of said perforations are free, or intended to be kept free, of metal.

According to other characteristics:
  A rear side of the supporting member comprises an antenna formed by a plurality of turns comprising two connecting ends and in that the plurality of perforations form areas of magnetic permeability for the antenna,
  The perforations are positioned on the periphery of the device and/or at the centre, with the antenna being positioned at least partly substantially facing the magnetically permeable areas;
  The perforations are positioned arranged on the path (F) of the contact lands of an electrical contact reader connector when the device is inserted into the slot of a reader;
  The width of the contact lands is reduced toward the edge of the supporting member.

DESCRIPTION OF THE FIGURES

The invention will be better understood while referring to the following description given by way of non-restricting example, and to the appended drawings, wherein.

DETAILED DESCRIPTION OF THE INVENTION

Similar elements are designated by the same reference numbers in all the figures.

Figure 1:
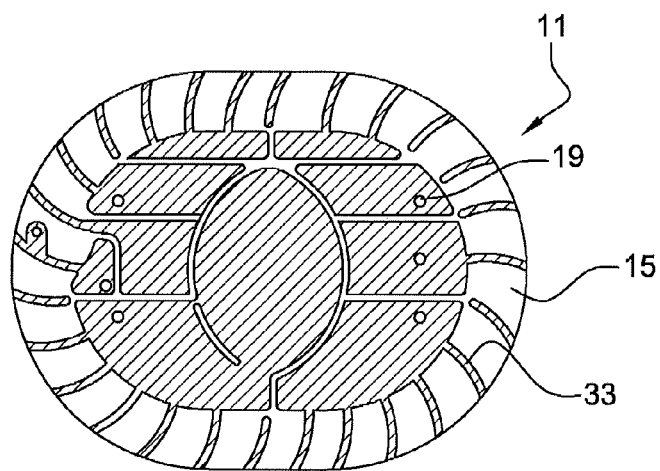
FIG. 1 shows a module for contactless chip card according to the state of the art
Figure 2:
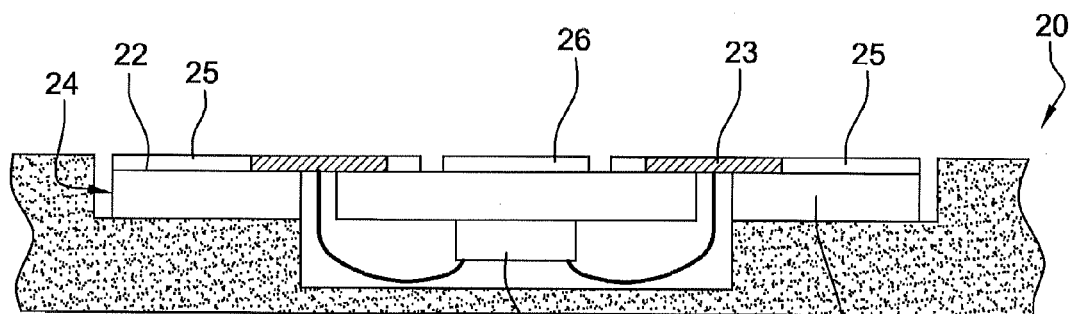
FIG. 2 shows a cross section of a contact card module according to an embodiment of the invention.

In FIG. 2, a portable electronic device 20 comprises a supporting member 21 and a side 22 of the supporting member having contact lands 23 extending at least partially as far as the edge of the side 24. These lands are electrically connected to an electronic microcircuit 45.

In the present example the device is a smart card with electrical contacts and the supporting member is an electronic module insulating substrate 20 for a chip card. The module is inlaid in a chip card body 25. Alternately, the device may be the module itself.

According to a characteristic of an embodiment, conductive contact lands comprise a plurality of perforations 27.

In the case of chip cards, the perforations may be localized in areas 25, 26 different from the standardized contact lands C1-C8 (FIG. 5-8).

In the example, a plurality of perforations are circles but may have other geometric shapes.

The total of the removed surfaces must be sufficient to really enable saving on materials such as gold, palladium, nickel . . . while ensuring sufficient rigidity to meet the reliability requirements of the obtained products for example of the micro-module type.

The perforations are made during the manufacturing of the film by chemical etching or mechanical cutting at the same time as the contacts.

Holes, 300 µm in diameter, seem to be a good compromise with respect to the contact surfaces of the connectors and the mechanical resistance to flexion/torsion tests thanks to the module rigidity: no stairstep effect, no weakening of the electronic part. Preferably, the holes may be between 250 and 350 µm in diameter or have an equivalent surface.

However, this dimension may vary depending on the desired model and on the technological developments by the providers of the so-called "lead frame" module substrate (a substrate comprising or supporting contact lands).

The module may be cut in copper or in the dielectric supporting film to avoid corrosion. In the latter case copper is not exposed on the edge thereof, which limits corrosion phenomena. The space between the edge of the module and the electric areas may however be small enough not to create a stairstep effect or for the card reader connectors.

There is no risk of flow of the resin (bonding of the chip, encapsulation resin . . . ) during the assembly if it is deposited on an area where the dielectric is solid or if not so (in case of a central window, of weld zones) on an area where no perforations are provided in copper.

The perforations may be made anywhere outside areas C1-C8 defined by the ISO 7816 standard or partially (e.g. on the contact lands but not on the frame or vice versa, see FIGS. 5-8). The perforations may be limited on certain areas of the contact lands.

Figure 3:
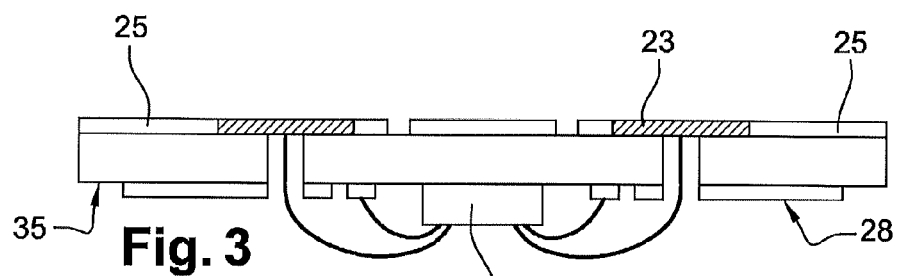
FIG. 3 shows a cross section of a module for a hybrid contactless card according to a second embodiment of the invention.

In FIG. 3, the module is a module for combination (or dual interface) card, wherein the antenna is positioned in a card body like 25 (not shown). The module here has metallizations 28 on both sides 25 and 35. These metallizations may also be perforated.

Figure 4:
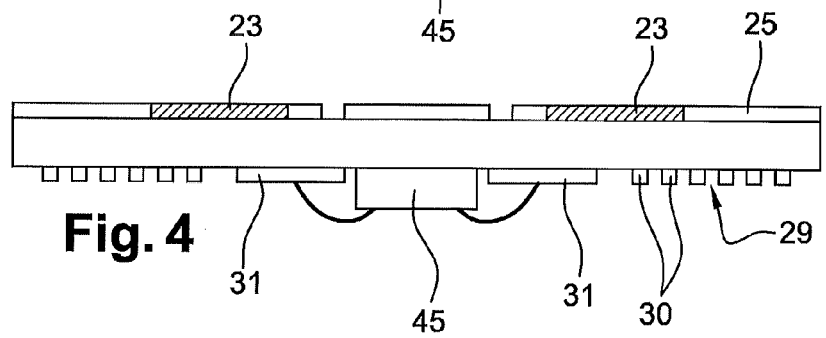
FIG. 4 shows a cross section of an antenna module for a hybrid contactless card according to a second embodiment of the invention.

In FIG. 4, the module is an antenna module. It receives, on the rear side, an antenna 29 formed of a plurality of turns 30 having two connecting ends 31. These ends 31 are connected to lands of the electronic chip.

Advantageously, the perforations form magnetic permeability areas for the antenna.

Figure 7:
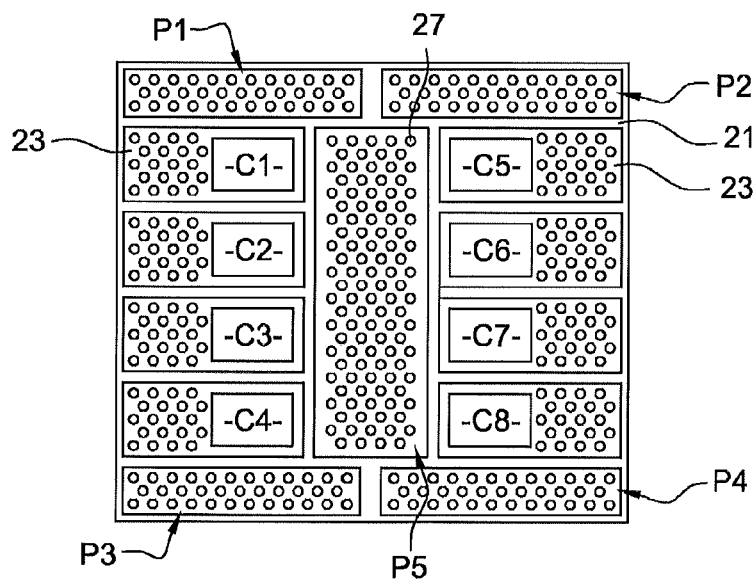

The perforations may be arranged on the periphery of the device and/or at the centre (FIG. 7). The turns of the antenna are arranged at least substantially partly opposite such magnetically permeable zones.

According to one characteristic of the invention, the perforations are arranged outside a path (arrow F) of the contact lands of an electrical contact reader connector when the device is inserted into the slot of a reader.

The perforations are positioned on the periphery of the device or at the centre thereof, and the turns are positioned substantially opposite the magnetically permeable zones.

The invention may relate to any form of a module wherein a number 6, 8 of contact lands is required (Other module types (plug-in combination), single-sided, double-sided of the combination type, antenna module and any new application having a side with electrical contacts.

The electrical contact lands in the form of parallelepipeds are known (see FIG. 5), but these may have other shapes that still enable a correct "lead" of the contact to the connectors.

Figure 8:
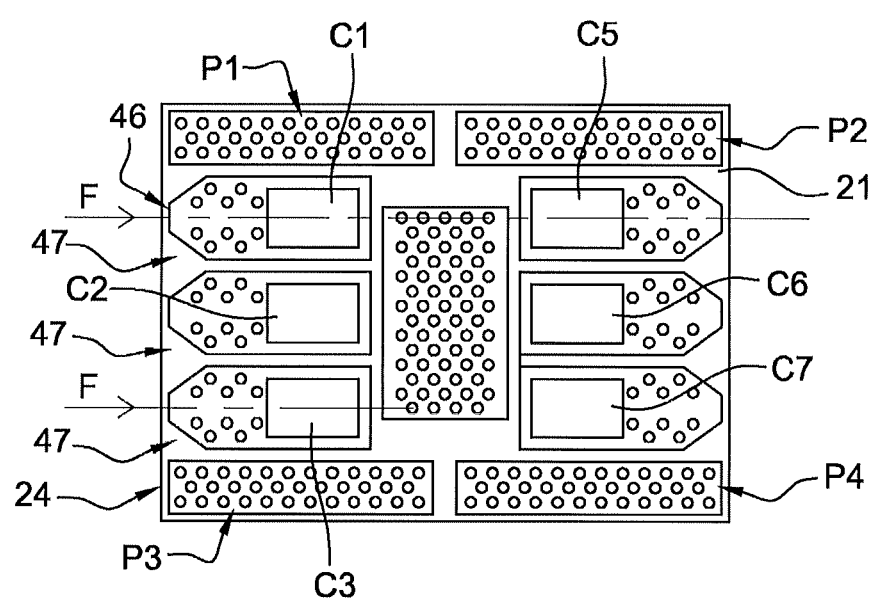

In particular, as shown in FIG. 8, the width 46 of the lands is reduced toward an edge 24 at least corresponding to the edge of introduction into a reader. The edges of the contacts, for example substantially have the shape of a "V". The tip of the V is substantially centred on the path of the connectors upon insertion into the reader.

Thus, this "V" shape makes it possible to clear magnetic permeability zones 47 between contact lands adjacent to one another.

Advantageously, the contact lands contain no perforation or a minimum of perforations arranged on the rectilinear path F of the reader connectors which is perpendicular to an edge 24 of the module.

Thus, the connectors always slide on substantially solid portions 49 made of conductive material, thus avoiding premature wear of the connectors and/or the contact lands.

Figure 5:
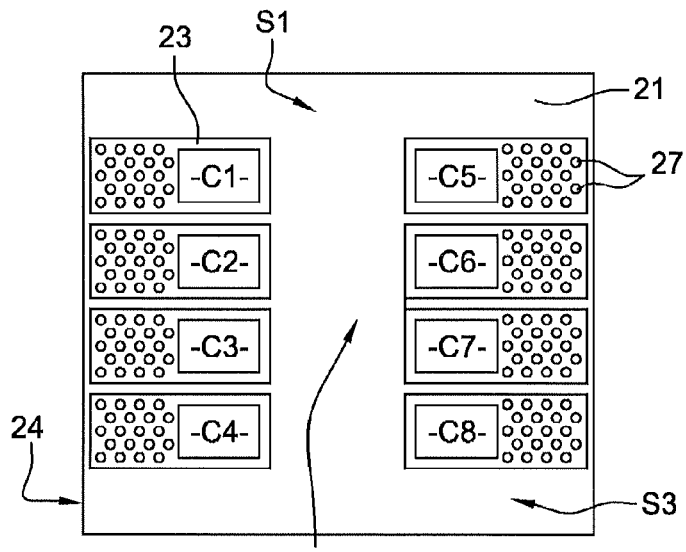
FIGS. 5 to 8 show a top view of alternative embodiments of the contact lands of an electronic module according to the invention.

In FIG. 5, the contact lands 23 extend as far as the edge of the module. The dielectric substrate 21 has a larger area S1 in the upper S1 and lower S2 part of the module.

The central part S3 between the zones C1-C8 has no metal surface either.

Figure 6:
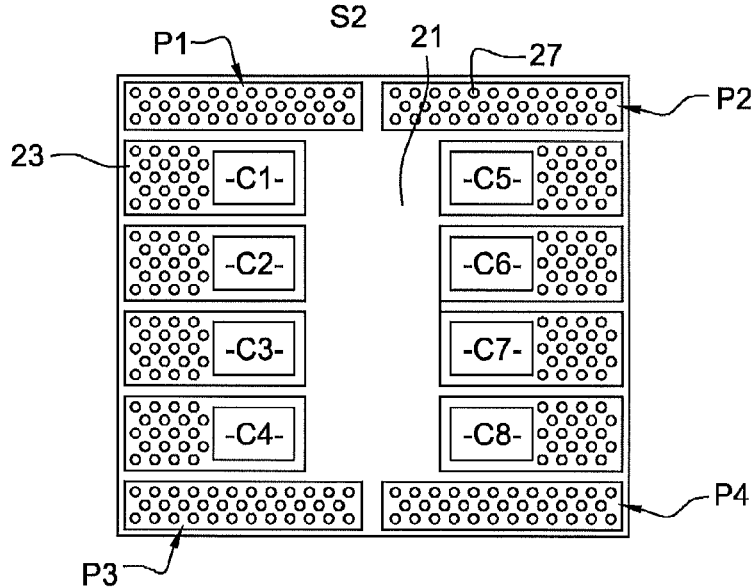

In FIGS. 6 and 7, the surfaces S1, S2, S3 referred to above are provided with parts P1-P5 comprising perforated metal. The advantage of these parts is to avoid steps for connectors but also to foster a correct distribution of bonding pressure on the module upon attachment thereof in a card body cavity and/or rigidity of the module.

The device may relate to a radiofrequency token of the RIFD type with a USB drive having or not a radiofrequency function, any integrated circuit chip electronic device having conductive tracks with a minimum surface more or less imposed by its function. The perforations make it possible to save 20 to 50% of metal as compared to the electrical contacts without reducing their electrical function or mechanical strength.

The conductive tracks or connections lands on the back of the module (FIG. 3) may also be perforated.

The metallizations may receive or comprise a partial or full insulating filling (resin or any other insulating material, e.g. plastics) which enables perforations with larger widths, e.g. above 350 µm, for example between 350 µm and 1,000 µm or more: 3,000 µm, while avoiding the problem of steps (or greater) above with respect to a reader connector. The module may also be reinforced by such perforations filling.

The perforations are free, and kept free, of metal or electrically conductive material at least inside, more particularly for saving purposes or for achieving magnetic permeability.

The metallizations may be free of metal or be formed with recesses upon production thereof.

The perforations may have other shapes such as for example zigzags, straight or curved slots, waves.

Any total or partial obstruction inside the perforations or opposite these perforations is thus excluded a priori. Exceptionally, antenna turns may be arranged opposite the perforations for achieving magnetic permeability, if need be (not only connection ends like document US2009/0271972).

The turns are preferably arranged on a side of a substrate (or a supporting member) opposite the one carrying the metallizations.

The invention claimed is:

1. A portable electronic device comprising a supporting member receiving on one side conductive contact lands or tracks extending substantially as far as the edge of the side and connecting an electronic microcircuit, with the conductive contact lands or tracks comprising a plurality of perforations, wherein the interior of said perforations is free, or intended to be kept free, of metal.

2. A portable electronic device according to claim 1, wherein a rear side of the supporting member comprises an antenna formed of an assembly of turns comprising two connecting ends and wherein the plurality of perforations form areas of magnetic permeability for the antenna.

3. A portable electronic device according to claim 2, wherein the perforations are positioned on the periphery of the device and/or at the centre, with the antenna being positioned at least partly substantially facing the magnetically permeable areas.

4. A portable electronic device according to claim 1, wherein the perforations are positioned on the path of the contact lands of an electrical contact reader connector when the device is inserted into the slot of a reader.

5. A portable electronic device according to claim 1, wherein the width of the contact lands is reduced toward the edge of the supporting member.

6. A portable electronic device according to claim 1, wherein the diameter of the perforations ranges from 250 to 350 μm.

7. A portable electronic device according to claim 1, wherein the device comprises or constitutes a chip card module, with the contact lands complying with ISO 7816 standard or a USB drive.

8. A portable electronic device comprising a supporting member receiving on one side conductive contact lands for connecting an electric contact reader, said contact lands connecting an electronic microcircuit, wherein the conductive contact lands comprise a plurality of perforations or recesses.

9. A portable electronic device according to claim 8, wherein the contact lands extend substantially as far as the edge of the side.

* * * * *